United States Patent
Grigorov et al.

(10) Patent No.: US 8,898,220 B2
(45) Date of Patent: Nov. 25, 2014

(54) REMOTE METHOD INVOCATION TUNNELING OVER HYPERTEXT TRANSFER PROTOCOL

(75) Inventors: Slavomir Grigorov, Sofia (BG); Polina Genova, Veliko Tarnovo (BG); Maria Jurova, Sofia (BG); Bojidar Kadrev, Sofia (BG); Diana Kaneva, Stara Zagora (BG); Tsvetko Trendafilov, Vratsa (BG); Diyan Yordanov, Varna (BG)

(73) Assignee: SAP SE, Walldorf (DE)

(*) Notice: Subject to any disclaimer, the term of this patent is extended or adjusted under 35 U.S.C. 154(b) by 541 days.

(21) Appl. No.: 12/883,165

(22) Filed: Sep. 15, 2010

(65) Prior Publication Data
US 2012/0066291 A1   Mar. 15, 2012

(51) Int. Cl.
*G06F 15/16* (2006.01)
*H04L 12/46* (2006.01)
*H04L 29/08* (2006.01)
*H04L 29/06* (2006.01)

(52) U.S. Cl.
CPC ............ *H04L 12/4633* (2013.01); *H04L 67/02* (2013.01); *H04L 67/2876* (2013.01); *H04L 67/40* (2013.01)
USPC .......................................... 709/203; 709/229

(58) Field of Classification Search
CPC .. H04L 12/4633; H04L 67/40; H04L 67/2876
USPC .......................................................... 709/203
See application file for complete search history.

(56) References Cited

U.S. PATENT DOCUMENTS

| | | | | |
|---|---|---|---|---|
| 6,917,971 | B1* | 7/2005 | Klein | 709/224 |
| 7,602,718 | B2* | 10/2009 | Omae et al. | 370/235 |
| 7,958,232 | B1* | 6/2011 | Colton et al. | 709/224 |
| 2008/0101320 | A1* | 5/2008 | Krahn et al. | 370/342 |
| 2008/0178278 | A1* | 7/2008 | Grinstein et al. | 726/12 |
| 2009/0276791 | A1* | 11/2009 | Meijer | 719/318 |
| 2011/0276702 | A1* | 11/2011 | Marchev et al. | 709/228 |

OTHER PUBLICATIONS jGURU; Remote Method Invocation (RMI); Sep. 2010; Oracle, Sun Developer Network (http://java.sun.com/developer/onlineTraining/rmi/RMI.html#FirewallIssues).
Wikipedia; Web service; Sep. 9, 2010; Wikipedia; (http://en.wikipedia.org/wiki/Web_service).

* cited by examiner

*Primary Examiner* — Joseph Greene

(57) ABSTRACT

Various embodiments of systems and methods for remote method invocation (RMI) tunneling over hypertext transfer protocol (HTTP) are described herein. RMI client uses HTTP client to send a protocol message in the body of an HTTP request to a special application on a server. The application dispatches the content of the message to RMI service of the server to handle remote call. RMI response may be sent in the HTTP response of the same HTTP request or some of the further requests. RMI callbacks initiated from the server back to the client are also delivered in an HTTP response of a client's HTTP request.

18 Claims, 4 Drawing Sheets

REMOTE METHOD INVOCATION TUNNELING OVER HYPERTEXT TRANSFER PROTOCOL

FIELD

The field relates to computer network tunneling. More precisely, the field relates to Remote Method Invocation (RMI) tunneling over Hypertext Transfer Protocol (HTTP).

BACKGROUND

Firewalls are commonly used by network enterprises to protect their Intranet from outside. Typically, all network traffic is blocked except for some intended ports to allow a certain protocol. Users can use tunneling to circumvent a firewall by using a protocol that the firewall would normally block, but "wrapped" inside a protocol that the firewall does not block, such as HTTP. If the firewall policy does not specifically exclude this kind of "wrapping", this trick can function to get around the intended firewall policy. Remote Method Invocation (RMI) enables the programmer to create distributed technology, in which the methods of remote objects can be invoked from other virtual machines on different hosts. The RMI transport layer opens dynamic socket connections between the client and the server to facilitate the communication. The Java Remote Method Protocol (JRMP) traffic is typically blocked by most firewall implementations. A solution is provided by the RMI transport layer itself. To get across firewalls, RMI makes use of HTTP tunneling by encapsulating the RMI calls within an HTTP request. The RMI client, the server, or both may operate from behind a firewall. Connections in HTTP only last for one transaction, for example, a method call, or a corresponding response if tunneling is used. This means that in case of multiple calls, we are creating and destroying socket connections repeatedly. This need not happen in JRMP, where socket connections can be used for multiple, successive transactions.

SUMMARY

Various embodiments of systems and methods for RMI tunneling over HTTP are described herein. In one embodiment, the method includes starting a tunneled connection between a client computer and a server computer and sending an HTTP request from the client computer to the server computer, the HTTP request encapsulating a first protocol message. The method also includes parsing the HTTP request at the server computer and reconstructing the first protocol message, and executing the first protocol message at the server computer and generating a second protocol message. The method further includes sending the second protocol message to an outgoing queue of the server computer and releasing the second protocol message from the outgoing queue of the server computer as HTTP response to the client computer.

In another embodiment, the system includes a client computer and a server computer to perform network tunneling through HTTP, an HTTP client module within the client computer, the HTTP client module to send an HTTP request encapsulating a first protocol message to the server computer, and a parser module within the server computer, the parser module to parse the content of the HTTP request and reconstruct the first protocol message. The system further includes a dispatcher module within the server computer to execute the first protocol message and generate a second protocol message and a queue module within the server computer, the queue module to collect the second protocol message and prepare it for sending to the client computer as an HTTP response.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for RMI tunneling over HTTP are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
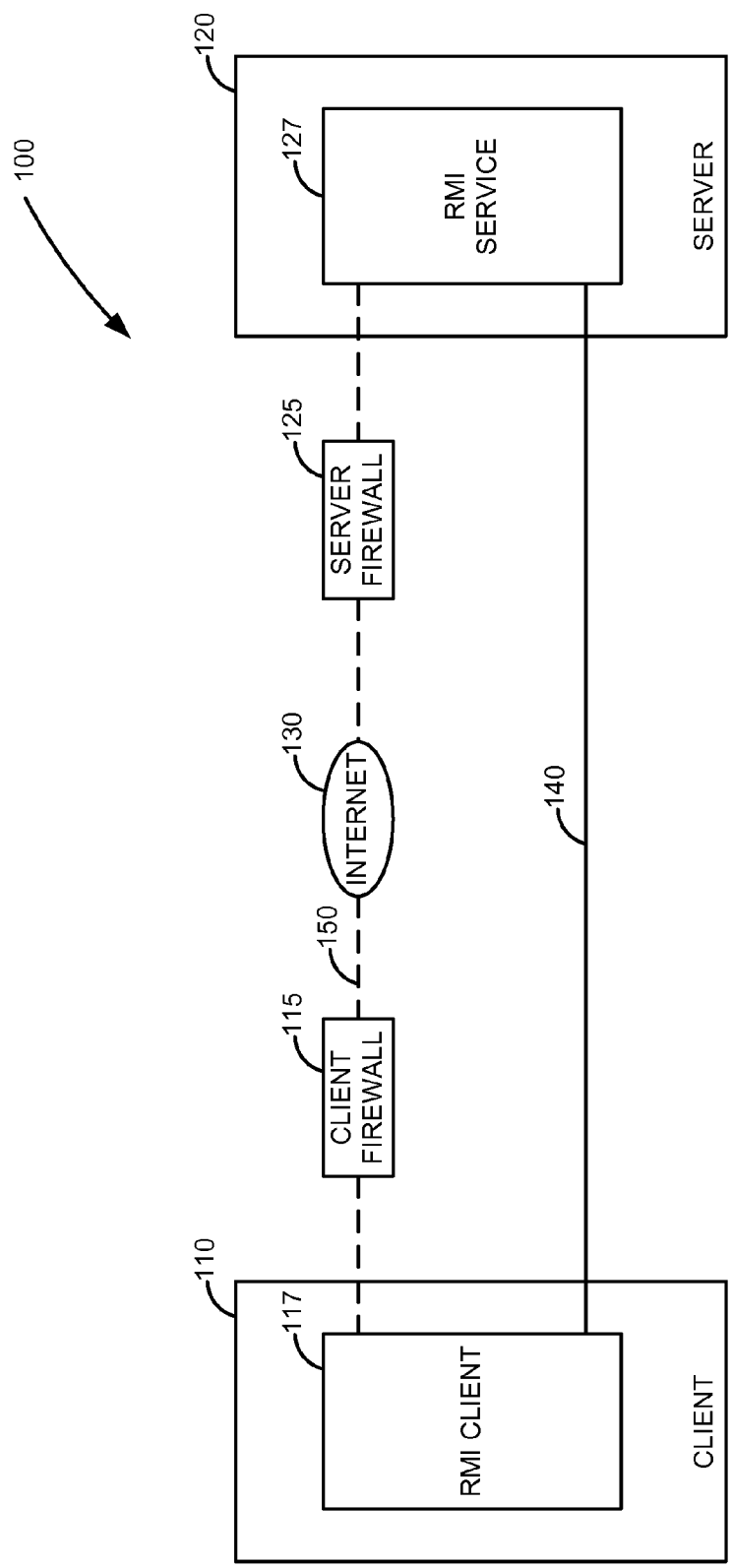
FIG. 1 is a block diagram of an embodiment of a system for direct client-server connection and additional RMI tunneling over HTTP.

FIG. 1 is a block diagram of an embodiment of a system 100 for direct client-server connection and additional RMI tunneling over HTTP. The system 100 includes a client computer 110 and a server computer 120. The client computer 110 and the server computer 120 can communicate by means of a direct connection 140. In one embodiment, the communication is performed by means of the RMI-P4 protocol provided by SAP AG of Walldorf, Germany. The direct connection 140 may be accomplished, for example, by means of Transmission Control Protocol (TCP) connection with messages running in both directions (e.g., client-server and server-client), and at the same time. In one embodiment, the TCP connection transfers P4 messages between the client computer 110 and the server computer 120.

If the RMI client 117 within the client computer 110 needs to use the RMI service 127 on the server computer 120, and the direct connection 140 is not present, then the only possibility for the RMI client 117 is to use internet 130 to connect to the RMI service on the server computer. In this case, if at least one of the firewalls 115 and 125 of the client computer 110 and the server computer 120 are set to restrict the protocol that the RMI client 117 and the RMI service 127 use for their communication, then tunneled connection 150 may be used to circumvent firewall restrictions, using a protocol that the firewalls 115 and 125 allow, such as HTTP for example. The peculiarities of the allowed protocol used for tunneling affect the way the RMI client 117 and the RMI service 127 normally communicate.

Figure 2:
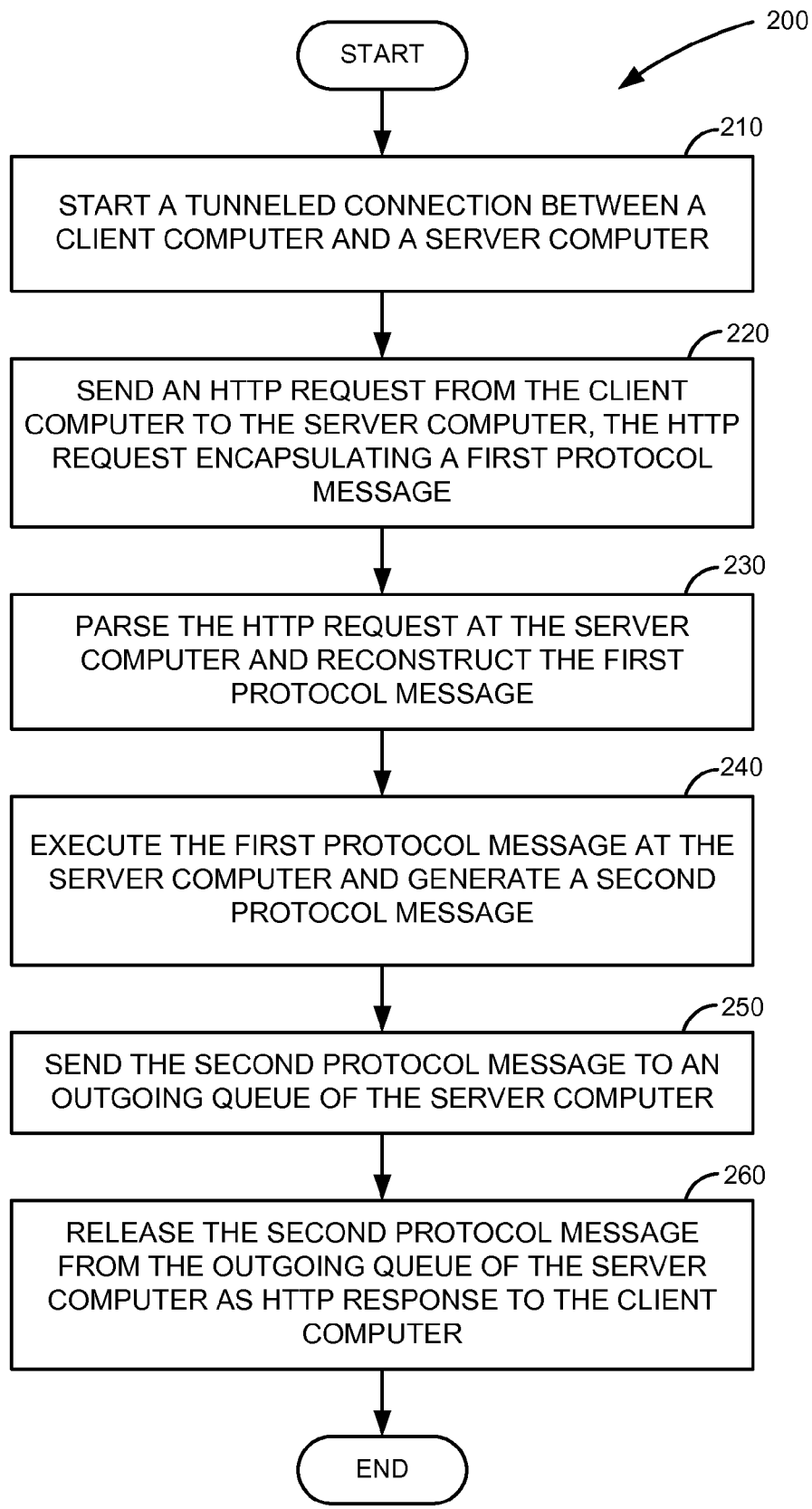
FIG. 2 is a flow diagram of an embodiment of a method for RMI tunneling over HTTP.

FIG. 2 is a flow diagram of an embodiment of a method 200 for RMI tunneling over HTTP. The method begins at block 210 with starting a tunneled connection between a client computer and a server computer. A tunneled connection between a client computer and a server computer is used when the protocol that the client computer and the server computer normally use is forbidden by their firewalls.

At block 220, an HTTP request is sent from the client computer to the server computer, the HTTP request encapsulating a first protocol message. The client computer sends a protocol message to the server computer by the allowed HTTP protocol. The protocol message is put in the body of the HTTP request and sent to the server computer. In one embodiment, an RMI-P4 protocol message is put as binary data after the HTTP header. This saves time as there is no conversion of the RMI-P4 protocol message to text Extensible Markup Language (XML) for instance. In one embodiment, an HTTP request from the client computer may carry more than one protocol message in its body. This saves socket creation time and also network resources as only a single HTTP connection from client is reused by several protocol messages. In yet another embodiment, the protocol messages may be of different types, for example, request messages, reply messages, informative messages, etc.

At block 230, the HTTP request is parsed at the server computer to reconstruct the first protocol message. The reconstructed message may then be processed by the server computer. In one embodiment, a specially designed web application at the server computer is used to parse the HTTP request and reconstruct the one or more protocol messages embodied in the HTTP request.

At block 240, the first protocol message is executed at the server computer and a second protocol message is generated. The second protocol message is in response to the first protocol message and is meant for the client computer.

At block 250, the second protocol message is sent to an outgoing queue of the server computer. The outgoing queue of the server computer serves as a buffer to keep messages from the server computer to the client computer till they are released. The release is accomplished as an HTTP response to an HTTP request.

At block 260, the second protocol message is released from the outgoing queue of the server computer as HTTP response to the client computer. The HTTP response may be as a result of the HTTP request encapsulating the first protocol message but if the time interval after the HTTP request encapsulating the first protocol message is too long, and the HTTP connection is closed, then the second protocol message is sent by means of HTTP response to a consequent HTTP request from the client computer. Thus the response is delivered to the client in further communications, which, in case of time consuming remote methods, saves server worker threads. In one embodiment, an HTTP response to the client computer may carry more than one protocol message in its body and even the protocol messages may be of different types. Thus several messages from the outgoing queue may be sent simultaneously in one HTTP response. In one embodiment, empty HTTP requests are initiated by the client computer to expect server computer callbacks. The empty HTTP requests are ping requests initiated by the client to check for server calls. For example, when a server calls a client callback function, this may be performed through an HTTP response to an HTTP ping request. In yet another embodiment, the empty HTTP requests are sent at a configurable time interval depending on the traffic between the client computer and the server computer. In one embodiment, the configurable time interval depends on an adaptive algorithm according to the traffic information between the client computer and the server computer.

The needed "ping timeout" is estimated in order to try to balance the traffic overhead of the tunneling with the server to client messages delay. Ping timeout is a time interval between two consecutive empty HTTP requests/responses. When the ping timeout is too short, there is unneeded traffic of empty HTTP messages. This means an increase of overhead of the network load and increased demand on server side Input/Output (IO) resources and Central Processor Unit (CPU) time. This overload may be extremely severe when there are a lot of clients. In case of rare ping messages (long ping timeout), there is a possibility of long delay for server to client messages. An algorithm for adaptive ping timeout may be used to balance between both extremes. When there is frequent communication there are no ping requests at all because they are not needed. When the client side has no more messages to send, the ping timeout becomes longer. In one embodiment, ping timeout is estimated based on previous non empty HTTP request/response. The measured value (t) is a time period between the time the client received the previous non empty HTTP request/response and the start of the last HTTP request. Non empty HTTP request/response is a request or response that has transferred some data. The measured value (t) is multiplied by some coefficient (k), and this is our new ping timeout proposal (p).

$$p=t*k$$

The k is in the interval (0,1) and is calculated as:

$$k=1/n$$

The n should be a positive integer. When n is greater, it will increase ping acceleration when intensive communication from server side begins again. In one embodiment, n=1 is chosen, because after server initiated some RMI call, usually client response is fast, and both HTTP request/response pair. The time interval for the pair becomes a new base (t) for the next ping timeout calculation. To avoid a too long ping timeout in the time of inactivity, and avoid ping during active communication, there are configurable margins of the ping timeout. If the ping timeout proposal (p) is greater than upper margin, it is set to the upper margin value. If it is lower than low margin it is set to the lower margin value.

Figure 3:
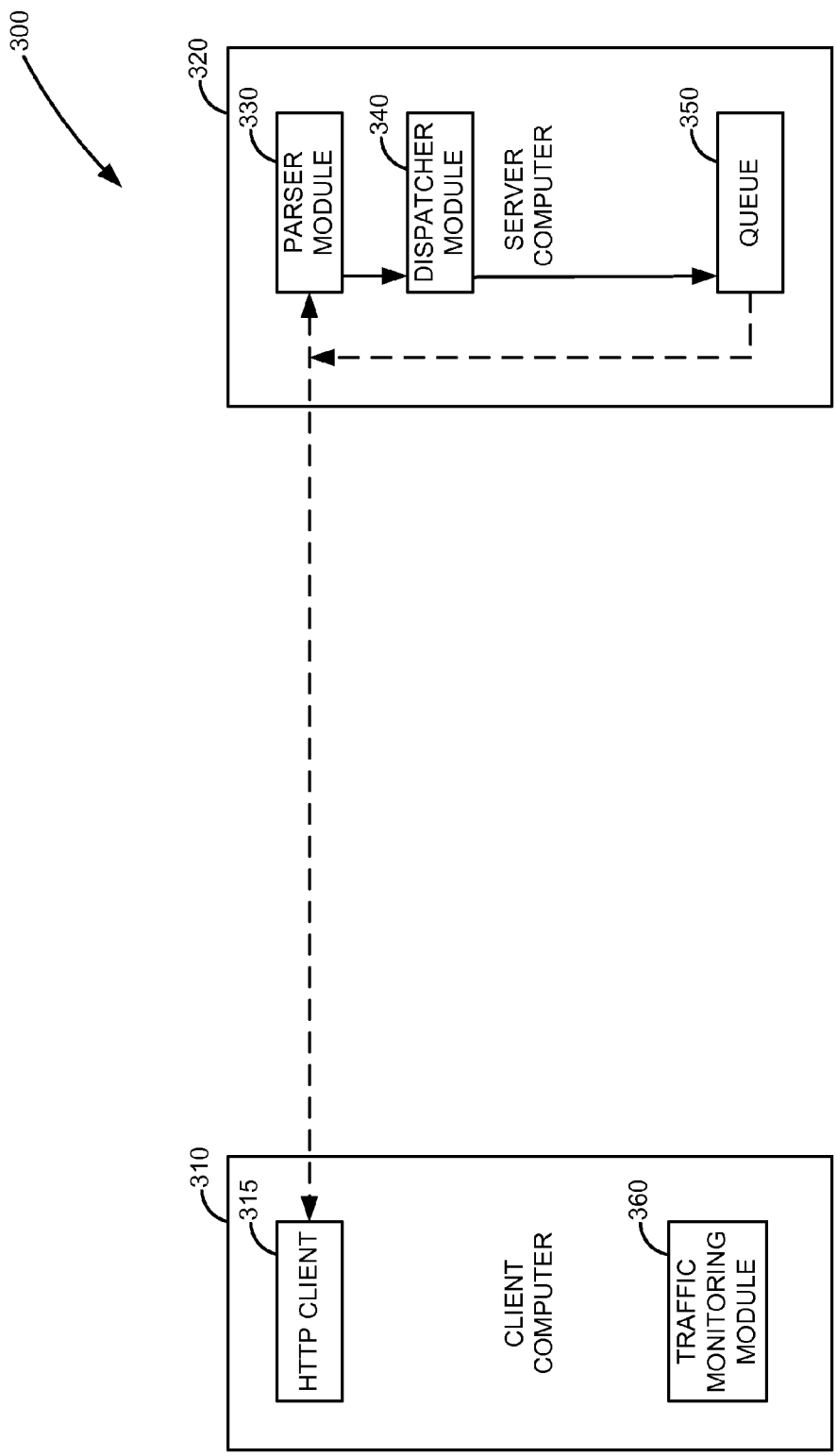
FIG. 3 is a block diagram of an embodiment of a system for RMI tunneling over HTTP.

FIG. 3 is a block diagram of an embodiment of a system 300 for RMI tunneling over HTTP. The system includes a client computer 310 and a server computer 320 to perform network tunneling through HTTP. An HTTP client module 315 within the client computer is intended to send HTTP requests encapsulating a first protocol message to the server computer 320. A parser module 330 within the server computer 320 is intended to parse the HTTP request and reconstruct the first protocol message. Then the reconstructed first protocol message is received by a dispatcher module 340 within the server computer. The dispatcher module 340 is intended to execute the first protocol message and generate a second protocol message. The second protocol message is in response to the first protocol message. The generated second protocol message is then sent to a queue module 350 within the server computer 320. The queue module 350 collects the second protocol message and prepares it for sending to the client computer 310 as an HTTP response.

In one embodiment, more than one protocol messages of different types are sent through a single HTTP request or HTTP response. In one embodiment, the client computer 310 initiates empty HTTP requests to the server computer 320 to expect server computer callbacks. In yet another embodiment, the empty HTTP requests are sent by the client computer 310 at a configurable time interval depending on the traffic between the client computer 310 and the server computer 320. In yet another embodiment, the configurable time interval depends on an adaptive algorithm according to the traffic information between the client computer 310 and the server computer 320. In yet another embodiment, the traffic information is gathered by measurements of previous communication between the client computer 310 and the server computer 320. In yet another embodiment, the measurements of previous communication between the client computer 310 and the server computer 320 are gathered in a traffic monitoring module 360. In one embodiment the traffic monitoring module 360 is situated within the client computer 310.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 4:
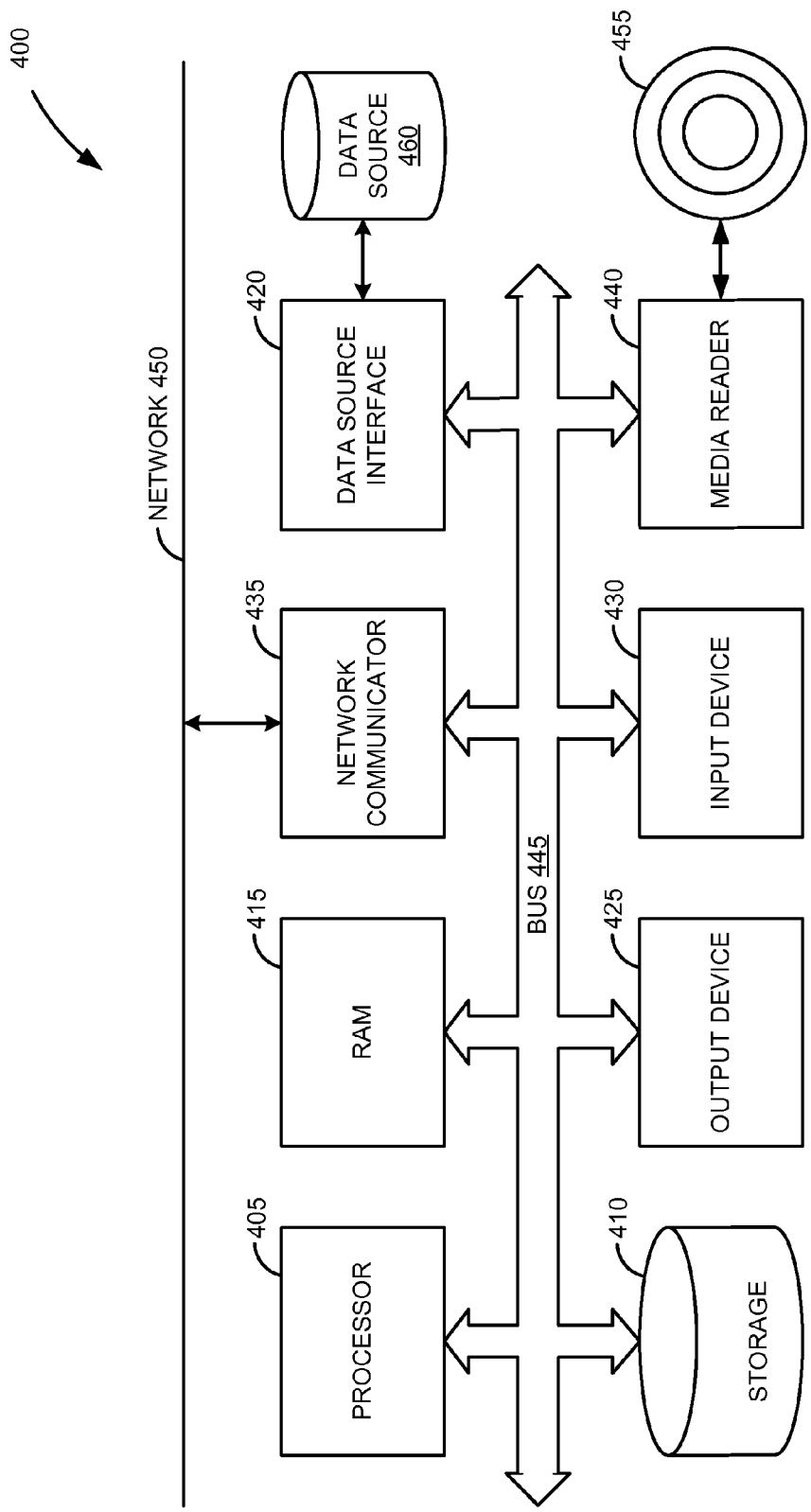
FIG. 4 is a block diagram illustrating a computing environment in which the techniques described for RMI tunneling over HTTP can be implemented, according to an embodiment of the invention.

FIG. 4 is a block diagram of an exemplary computer system 400. The computer system 400 includes a processor 405 that executes software instructions or code stored on a computer readable storage medium 455 to perform the above-illustrated methods of the invention. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, comprising:
    receive an HTTP request at a server computer, the HTTP request encapsulating a first protocol message;
    receive an empty HTTP request at a configurable time interval at the server computer for server callback, wherein the configurable time interval is computed based on:
        an adaptive ping timeout estimated based on a previous non-empty HTTP request and a HTTP response;
        a ping timeout proposal computed based on a time period between a client computer receiving a non-empty HTTP request and a HTTP response, and a start of a last HTTP request; and
        a configurable margin of the ping timeout, wherein upon determining that the ping timeout proposal is greater than an upper margin set the ping timeout proposal to the upper margin, and upon determining that the ping timeout proposal is lower than a lower margin set the ping timeout proposal to the lower margin;
    parse the HTTP request at the server computer and reconstruct the first protocol message;
    execute the first protocol message at the server computer and generate a second protocol message;
    send the second protocol message to an outgoing queue of the server computer; and
    release the second protocol message from the outgoing queue of the server computer as a HTTP response to a client computer.

2. The article of manufacture of claim 1, wherein a plurality of protocol messages of different types is sent through a single HTTP request body and a plurality of protocol messages of different types is sent through a single HTTP response body.

3. A computer-implemented method for network tunneling, the method comprising:
    receiving an HTTP request at a server computer, the HTTP request encapsulating a first protocol message;
    receiving an empty HTTP request at a configurable time interval at the server computer for server callback, wherein the configurable time interval is computed based on:
        an adaptive ping timeout estimated based on previous non-empty HTTP request and a HTTP response;
        a ping time proposal computed based on a time period between a client computer receiving a non-empty HTTP request and a HTTP response, and a start of a last HTTP request; and
        a configurable margin of the ping timeout, wherein upon determining that the ping timeout proposal is greater than an upper margin set the ping timeout proposal to the upper margin, and upon determining that the ping timeout proposal is lower than a lower margin set the ping timeout proposal to the lower margin;
    parsing the HTTP request at the server computer and reconstructing the first protocol message;
    executing the first protocol message at the server computer and generating a second protocol message;
    sending the second protocol message to an outgoing queue of the server computer; and
    releasing the second protocol message from the outgoing queue of the server computer as a HTTP response to a client computer.

4. The computer-implemented method of claim 3, wherein a plurality of protocol messages of different types is sent through a single HTTP request body and a plurality of protocol messages of different types is sent through a single HTTP response body.

5. A computer system for network tunneling, the system comprising:
    a computer memory to store program code; and
    a processor to execute the program code to:
        a server computer to receive an HTTP request encapsulating a first protocol message;
        the server computer to receive an empty HTTP request at a configurable time interval at the server computer for server callback, wherein the configurable time interval is computed based on:
            an adaptive ping timeout estimated based on previous non-empty HTTP request and a HTTP response;
            a ping timeout proposal computed based on a time period between a client computer receiving a non-empty HTTP request and a HTTP response, and a start of a last HTTP request; and
            a configurable margin of the ping timeout, wherein upon determining that the ping timeout proposal is greater than an upper margin set the ping timeout proposal to the upper margin, and upon determining that the ping timeout proposal is lower than a lower margin set the ping timeout proposal to the lower margin;
        a parser module within the server computer, the parser module to parse the HTTP request and reconstruct the first protocol message;
        a dispatcher module within the server computer to execute the first protocol message and generate a second protocol message; and
        a queue module within the server computer, the queue module to collect the second protocol message and prepare it for sending to a client computer as a HTTP response.

6. The computer system of claim 5, wherein the processor further executes the program code to:
a HTTP client module within the client computer, the HTTP client module to send the HTTP request encapsulating the first protocol message to the server computer.

7. The computer system of claim 5, wherein a plurality of protocol messages of different types is sent through a single HTTP request and a plurality of protocol messages of different types is sent through a single HTTP response.

8. The article of manufacture of claim 1, wherein the first protocol is encapsulated as binary data in the HTTP request.

9. The article of manufacture of claim 1, wherein the HTTP response is corresponding to the empty HTTP request.

10. The article of manufacture of claim 1, storing further instructions, which when executed by the computer, cause the computer to send the second protocol message as a HTTP response to a consequent HTTP request.

11. The computer-implemented method of claim 3, wherein the first protocol is encapsulated as binary data in the HTTP request.

12. The computer-implemented method of claim 3, wherein the HTTP response is corresponding to the empty HTTP request.

13. The computer-implemented method of claim 3 further comprises:
sending the second protocol message as a HTTP response to a consequent HTTP request.

14. The computer system of claim 5, wherein the first protocol is encapsulated as binary data in the HTTP request.

15. The computer system of claim 5, wherein the HTTP response is corresponding to the empty HTTP request.

16. The computer system of claim 5, wherein the processor further executes the program code to:
send the second protocol message as a HTTP response to a consequent HTTP request.

17. The article of manufacture of claim 1, further comprises instructions which when executed by the computer cause the computer to:
a HTTP client module within the client computer, the HTTP client module to send the HTTP request encapsulating the first protocol message to the server computer.

18. The computer-implemented method of claim 3, further comprises:
a HTTP client module within the client computer, the HTTP client module sending the HTTP request encapsulating the first protocol message to the server computer.

* * * * *